US011922861B1

(12) United States Patent
Liao et al.

(10) Patent No.: US 11,922,861 B1
(45) Date of Patent: Mar. 5, 2024

(54) MICRO LIGHT-EMITTING DIODE DISPLAY DEVICE AND DRIVING METHOD THEREOF

(71) Applicant: PlayNitride Display Co., Ltd., Miaoli County (TW)

(72) Inventors: Kuan-Yung Liao, Miaoli County (TW); Yun-Li Li, Miaoli County (TW)

(73) Assignee: PLAYNITRIDE DISPLAY CO., LTD., Zhunan Township (TW)

( * ) Notice: Subject to any disclaimer, the term of this patent is extended or adjusted under 35 U.S.C. 154(b) by 0 days.

(21) Appl. No.: 17/963,354

(22) Filed: Oct. 11, 2022

(30) Foreign Application Priority Data

Aug. 31, 2022 (TW) .................................. 111133033

(51) Int. Cl.
*G09G 3/32* (2016.01)

(52) U.S. Cl.
CPC ....... *G09G 3/32* (2013.01); *G09G 2300/0408* (2013.01); *G09G 2300/0452* (2013.01); *G09G 2300/0842* (2013.01); *G09G 2310/0205* (2013.01); *G09G 2310/0267* (2013.01); *G09G 2310/0275* (2013.01); *G09G 2310/08* (2013.01); *G09G 2320/0242* (2013.01); *G09G 2330/023* (2013.01)

(58) Field of Classification Search
CPC ............. G09G 3/32; G09G 2300/0408; G09G 2300/0452; G09G 2300/0842; G09G 2310/0205; G09G 2310/0267; G09G 2310/0275; G09G 2310/08; G09G 2320/0242; G09G 2330/023
See application file for complete search history.

(56) References Cited

U.S. PATENT DOCUMENTS

| | | | | |
|---|---|---|---|---|
| 2006/0146827 A1 | 7/2006 | Kim | | |
| 2018/0293929 A1 | 10/2018 | Shigeta et al. | | |
| 2023/0154372 A1* | 5/2023 | Hwang .................... | G09G 3/32 | 345/691 |

FOREIGN PATENT DOCUMENTS

| | | |
|---|---|---|
| CN | 113396452 A | 9/2021 |
| CN | 114694570 A | 7/2022 |
| TW | 202015024 A | 4/2020 |

* cited by examiner

*Primary Examiner* — Gerald Johnson

(74) *Attorney, Agent, or Firm* — Muncy, Geissler, Olds & Lowe, P.C.

(57) ABSTRACT

Micro LED display device and driving method thereof. The display device includes a display substrate and a data driving circuit. The display substrate includes multiple pixels, and each pixel includes a first subpixel and a second subpixel. The first subpixel has a first subpixel circuit and a first light-emitting element. The second subpixel has a second subpixel circuit and a second light-emitting element. The first subpixel circuit and the second subpixel circuit are configured independently. The data driving circuit is electrically connected to the first and the second subpixel circuits. The data driving circuit transmits a first data signal to the first subpixel circuits to drive the first light-emitting elements and a second data signal to the second subpixel circuits to drive the second light-emitting elements. The first data signal is a PWM signal, and the second data signal is a PAM signal.

20 Claims, 7 Drawing Sheets

MICRO LIGHT-EMITTING DIODE DISPLAY DEVICE AND DRIVING METHOD THEREOF

CROSS REFERENCE TO RELATED APPLICATIONS

This Non-provisional application claims priority under 35 U.S.C. § 119(a) on Patent Application No(s). 111133033 filed in Taiwan, Republic of China on Aug. 31, 2022, the entire contents of which are hereby incorporated by reference.

BACKGROUND

Technology Field

The present disclosure relates to a display device and a driving method thereof. In particular, the present disclosure relates to a micro light-emitting diode (LED) display device and a driving method thereof.

Description of Related Art

The conventional micro LED display device includes a plurality of pixels, and the circuits of these pixels are all the same. In general, the micro LEDs of all pixels are controlled to emit light by pulse-width modulation (PWM) technology. However, the PWM control technology has the problems of short charging time due to high current characteristics of the line when the panel is powered on, and IR drop in high-resolution display. Alternatively, the micro LEDs of all pixels can be controlled to emit light by Pulse-Amplitude Modulation (PAM) technology. However, the wavelengths of the micro LEDs will shift under different current densities, which may cause serious color shift of the display screen.

SUMMARY

An objective of this disclosure is to provide a micro LED display device having independently configured subpixel circuits and a driving method thereof.

To achieve the above, a micro LED display device includes a display substrate and a data driving circuit. The display substrate includes a plurality of pixels, and each of the pixels includes a first subpixel and a second subpixel. The first subpixel has a first subpixel circuit and a first light-emitting element electrically connected to the first subpixel circuit. The second subpixel has a second subpixel circuit and a second light-emitting element electrically connected to the second subpixel circuit. The first subpixel circuit and the second subpixel circuit are configured independently with each other. The data driving circuit is electrically connected to the first subpixel circuits and the second subpixel circuits via a plurality of data lines. The data driving circuit transmits a first data signal to each of the first subpixel circuits to drive each of the first light-emitting elements, and transmits a second data signal to each of the second subpixel circuits to drive each of the second light-emitting elements. The first data signal is a pulse-width modulation (PWM) signal, and the second data signal is a pulse-amplitude modulation (PAM) signal.

To achieve the above, this disclosure also provides a driving method of a micro LED display device. The display device includes a display substrate and a data driving circuit. The display substrate includes a plurality of pixels, and each of the pixels includes a first subpixel and a second subpixel. The first subpixel has a first subpixel circuit and a first light-emitting element electrically connected to the first subpixel circuit. The second subpixel has a second subpixel circuit and a second light-emitting element electrically connected to the second subpixel circuit. The first subpixel circuit and the second subpixel circuit are configured independently with each other, and the data driving circuit is electrically connected to the first subpixel circuits and the second subpixel circuits via a plurality of data lines. The driving method includes the following steps of: the data driving circuit transmitting a first data signal to each of the first subpixel circuits to drive each of the first light-emitting elements; and the data driving circuit transmitting a second data signal to each of the second subpixel circuits to drive each of the second light-emitting elements. The first data signal is a PWM signal, and the second data signal is a PAM signal.

As mentioned above, in the micro LED display device and driving method thereof, each pixel includes a first subpixel circuit and a second subpixel circuit, which are independently configured, and the data driving circuit transmits the first data signal (PWM signal) to each first subpixel circuit to drive each first light-emitting element to emit light and transmits the second data signal (PAM signal) to each second subpixel circuit to drive each second light-emitting element to emit light. Compared with the conventional micro LED display device, which has the pixels (subpixels) all configured with the same circuits and utilizes either the PWM technology or the PAM technology to control the light-emitting elements of all pixels to emit light, the micro LED display device of this disclosure has a novel circuitry configuration with two independent subpixel circuits in one pixel and utilizes a novel driving method for controlling the two kinds of subpixel circuits, thereby solving the color shift problem of the PAM technology and being suitable for high-resolution display.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
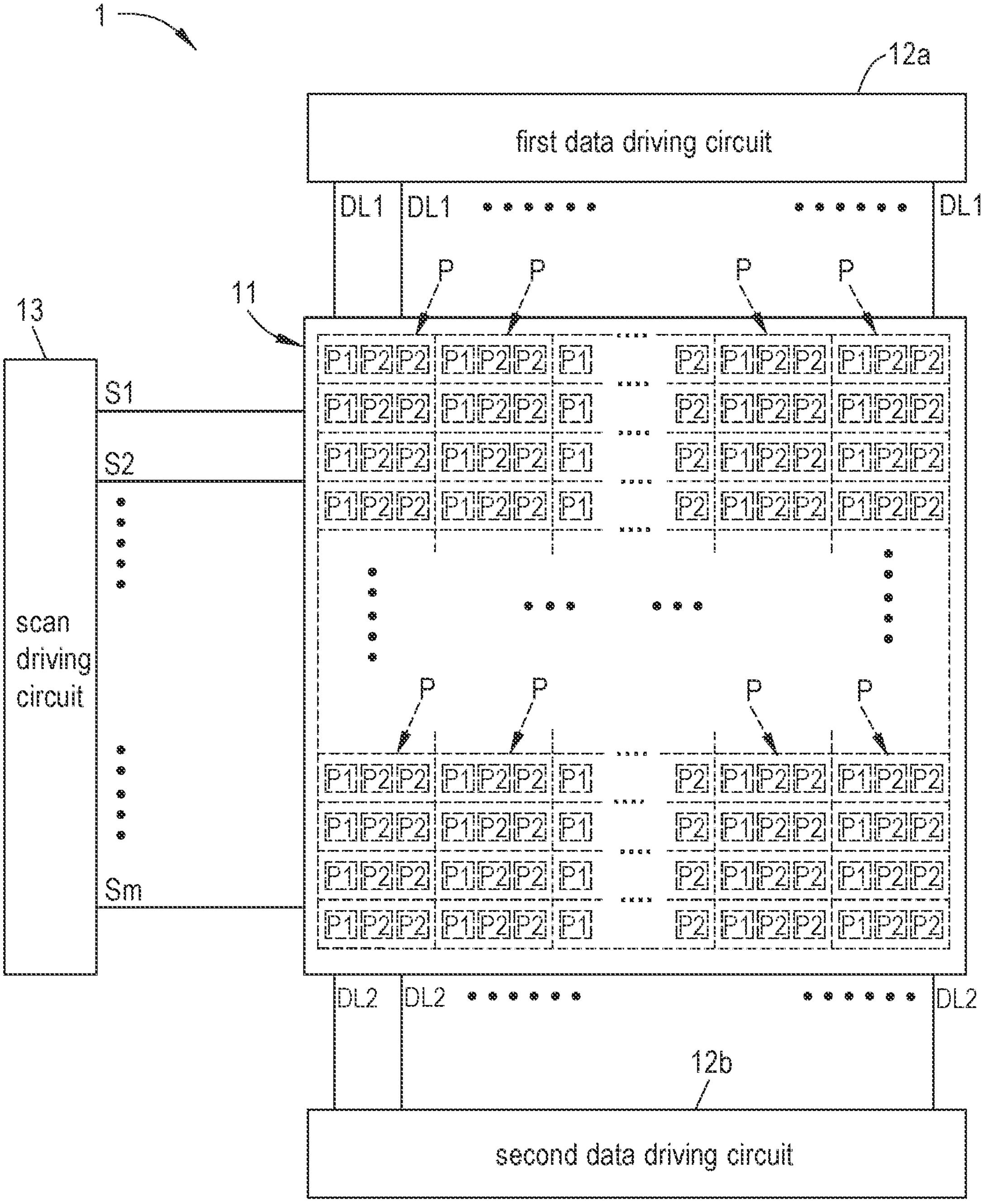
FIG. 1A is a schematic diagram showing a micro LED display device according to an embodiment of this disclosure.
Figure 1B:
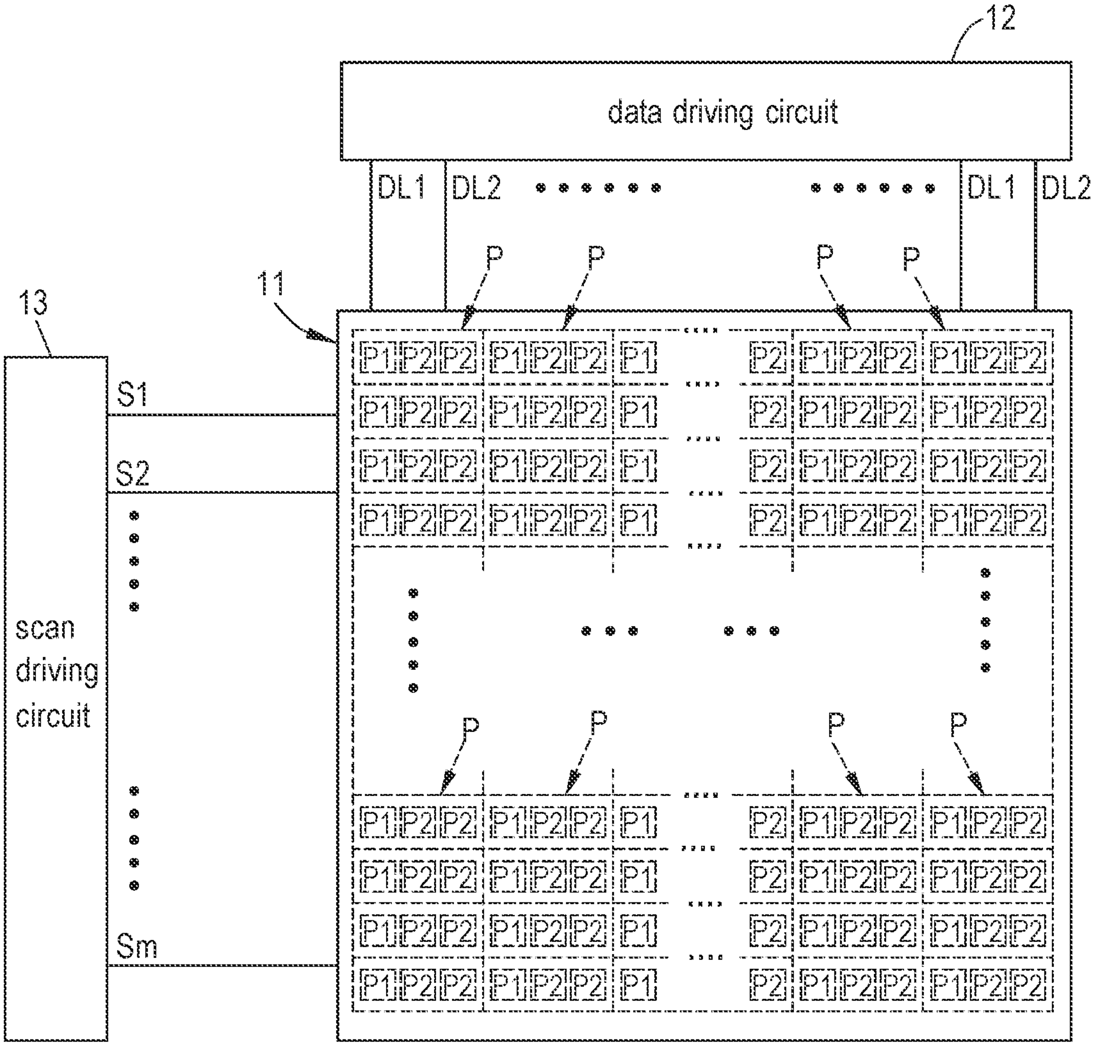
FIG. 1B is a schematic diagram showing a micro LED display device according to another embodiment of this disclosure.
Figure 2A:
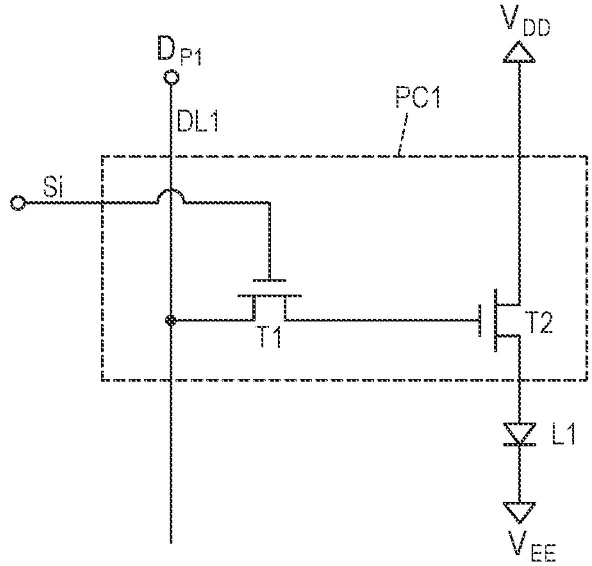
FIG. 2A is a schematic diagram showing the first subpixel circuit of each pixel in the micro LED display device of FIG. 1A or 1B.
Figure 2B:
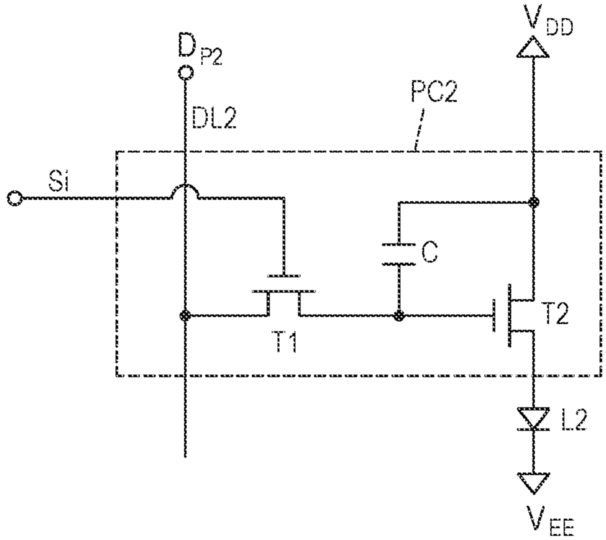
FIG. 2B is a schematic diagram showing the second subpixel circuit of each pixel in the micro LED display device of FIG. 1A or 1B.
Figure 3:
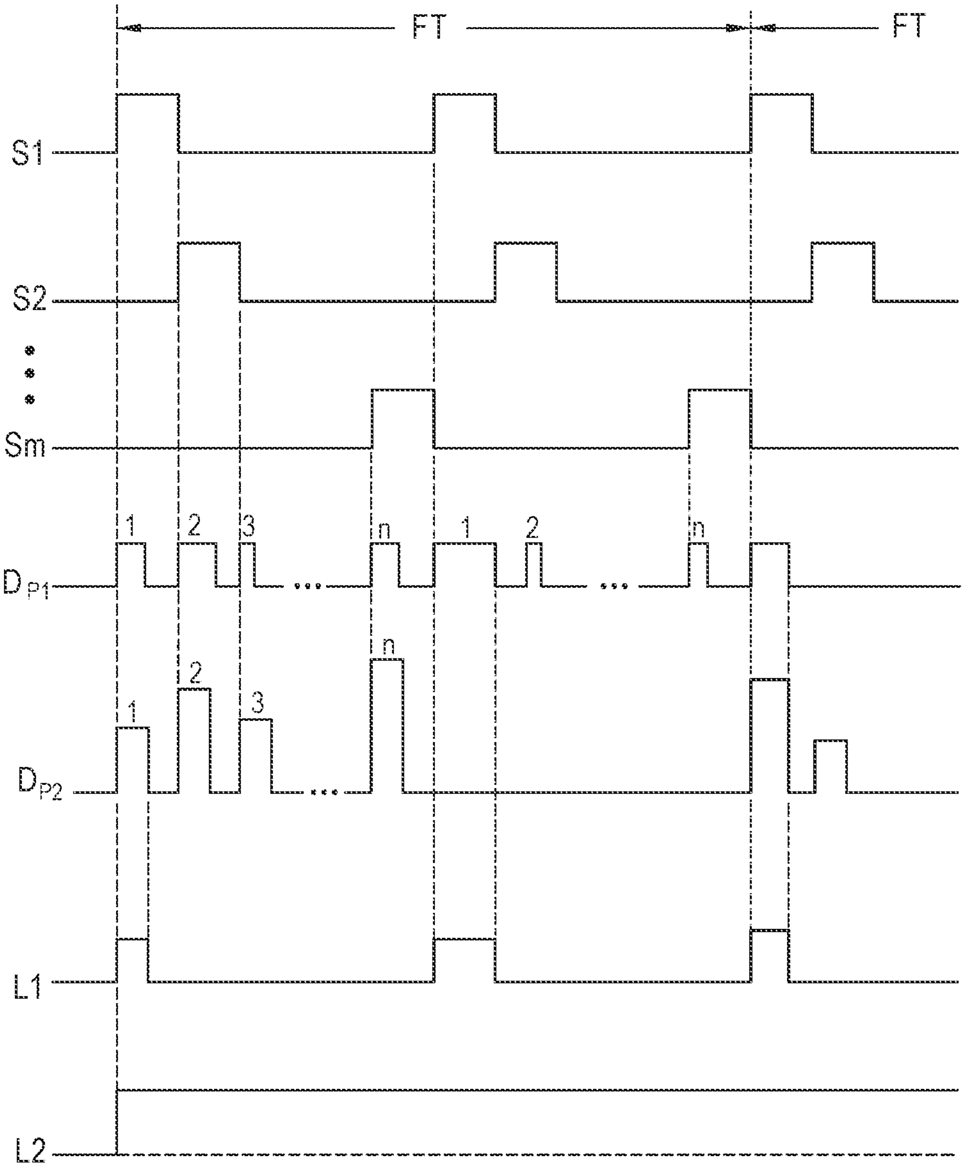
FIG. 3 is a waveform diagram showing the waveforms of signals for the micro LED display device of FIG. 1A or 1B.

FIG. 1A is a schematic diagram showing a micro LED display device according to an embodiment of this disclosure, FIG. 1B is a schematic diagram showing a micro LED display device according to another embodiment of this disclosure, FIG. 2A is a schematic diagram showing the first subpixel circuit of each pixel in the micro LED display device of FIG. 1A or 1B, FIG. 2B is a schematic diagram showing the second subpixel circuit of each pixel in the micro LED display device of FIG. 1A or 1B, and FIG. 3 is a waveform diagram showing the waveforms of signals for the micro LED display device of FIG. 1A or 1B.

Referring to FIGS. 1A, 2A and 2B, the micro LED display device 1 is an AM (active matrix) micro LED display device and includes a display substrate 11 and a data driving circuit. In this embodiment, the data driving circuit includes a first data driving circuit 12*a* and a second data driving circuit 12*b*.

The display substrate 11 includes a plurality of pixels P, which are arranged in an array with multiple columns and multiple rows. Each pixel P at least includes a first subpixel P1 and a second subpixel P2. The first subpixel P1 has a first subpixel circuit PC1 and a first light-emitting element L1 electrically connected to the first subpixel circuit PC1 (see FIG. 2A). The second subpixel P2 has a second subpixel circuit PC2 and a second light-emitting element L2 electrically connected to the second subpixel circuit PC2 (see FIG. 2B). The first subpixel circuit PC1 and the second subpixel circuit PC2 are configured independently with each other. Specifically, the first subpixel circuit PC1 and the second subpixel circuit PC2 are independent and individual circuits (not integrated). In addition, for example, the first light-emitting element L1 is a red-light micro LED, and the second light-emitting element L2 is a green-light or blue-light micro LED. In this embodiment, each pixel P includes a first subpixel P1 and two subpixels P2. The first subpixel circuit PC1 drives the first light-emitting element L1 to emit red light (i.e., the first light-emitting element L1 is a red-light micro LED), one of the second subpixel circuit PC2 drives the corresponding second light-emitting element L2 to emit green light (i.e., this second light-emitting element L1 is a green-light micro LED), and the other second subpixel circuit PC2 drives the corresponding second light-emitting element L2 to emit blue light (i.e., this second light-emitting element L1 is a blue-light micro LED).

The data driving circuit is electrically connected to the first subpixel circuits and the second subpixel circuits via a plurality of data lines. The data driving circuit transmits a first data signal to each of the first subpixel circuits to drive each of the first light-emitting elements, and transmits a second data signal to each of the second subpixel circuits to drive each of the second light-emitting elements. The first data signal is a pulse-width modulation (PWM) signal, and the second data signal is a pulse-amplitude modulation (PAM) signal. In this embodiment, the data lines includes a plurality of first data lines DL1 and a plurality of second data lines DL2, the first data driving circuit 12*a* is electrically connected to the first subpixel circuits PC1 via the first data lines DL1, and the second data driving circuit 12*b* is electrically connected to the second subpixel circuits PC2 via the second data lines DL2. Accordingly, the first data driving circuit 12*a* can transmit a first data signal $D_{P1}$ to each of the first subpixel circuit PC1 via the corresponding first data line DL1 to drive the corresponding first light-emitting element L1 to emit light, and the second data driving circuit 12*b* can transmit a second data signal $D_{P2}$ to each of the second subpixel circuit PC2 via the corresponding second data line DL2 to drive the corresponding second light-emitting element L2 to emit light. In this case, the first data signal $D_{P1}$ is a PWM signal, and the second data signal $D_{P2}$ is a PAM signal. Therefore, the first data driving circuit 12*a* can be a data driver for outputting PWM signals, and the second data driving circuit 12*b* can be a data driver for outputting PAM signals. This configuration can provide a better driving performance.

In another embodiment, as shown in FIG. 1B, only one data driving circuit 12 is configured. The data driving circuit 12 is electrically connected to the first subpixel circuits PC1 via a plurality of first data lines DL1, and electrically connected to the second subpixel circuit PC2 via a plurality of second data lines DL2. In this case, the data driving circuit 12 can transmit the first data signal $D_{P1}$ to each of the first subpixel circuit PC1 via the corresponding first data line DL1 to drive the corresponding first light-emitting element L1 to emit light, and transmit the second data signal $D_{P2}$ to each of the second subpixel circuit PC2 via the corresponding second data line DL2 to drive the corresponding second light-emitting element L2 to emit light.

In addition, referring to FIG. 1A, the micro LED display device 1 of this embodiment further includes a scan driving circuit 13, which is electrically connected to the first subpixel circuits PC1 and the second subpixel circuits PC2 via a plurality of scan lines S1~Sm. Herein, the scan driving circuit 13 can transmit a scan signal to the first subpixel circuits PC1 and the second subpixel circuit PC2 in sequence via the scan lines S1~Sm for further driving the first light-emitting elements L1 and the second light-emitting elements L2 of the pixels P in each row to emit light.

In the micro LED display device 1 of this embodiment, when the scan driving circuit 13 outputs the scan signal via the scan lines S1~Sm in sequence to sequentially turn on the pixels P of each row, the first data driving circuit 12*a* can transmit the first data signal $D_{P1}$ (PWM signal) for the pixels P of each row to the first subpixel circuits PC1 of the pixels P via the first data lines DL1, and the second data driving circuit 12*b* can transmit the second data signal $D_{P2}$ (PAM signal) for the pixels P of each row to the second subpixel circuits PC2 of the pixels P via the second data lines DL2, thereby driving or turning on the first light-emitting elements L1 and the second light-emitting elements L2 of the pixels P. Then, the display device can display the images. In this case, the first subpixel circuit PC1 can control the driving period for providing the driving current to the first light-emitting element L1 based on the PWM data voltage (the first data signal $D_{P1}$), and the second subpixel circuit PC2 can control the amplitude of the driving current provided to the second light-emitting element L2 based on the PAM data voltage (the second data signal $D_{P2}$). The first light-emitting element L1 is a red-light micro LED, and the PWM data voltage (the first data signal $D_{P1}$) allows the red-light micro LED, which is less performance at low current density, to have better performance under the PWM control. The second light-emitting element L2 is a green-light or blue-light LED, and the PAM data voltage (the second data signal $D_{P2}$) makes the micro LED, which is less affected by wavelength shift under different current densities, reach high-resolution display under the PAM control.

As mentioned above, in the micro LED display device 1 of FIG. 1A, each pixel P includes a first subpixel P1 and a second subpixel P2. The first subpixel P1 has a first subpixel circuit PC1 and the second subpixel P2 has a second subpixel circuit PC2, wherein the first subpixel circuit PC1 and the second subpixel circuit PC2 are configured independently with each other. The first data driving circuit 12*a* can transmit a first data signal $D_{P1}$ (the PWM signal) to each of the first subpixel circuits PC1 to drive each of the first light-emitting elements L1 to emit light, and the second data driving circuit 12*b* can transmit a second data signal $D_{P2}$ (the PAM signal) to each of the second subpixel circuits PC2 to drive each of the second light-emitting elements L2 to emit light. Compared with the conventional micro LED display device, which has the pixels (subpixels) all configured with the same circuits and utilizes either the PWM technology or the PAM technology to control the light-emitting elements of all pixels to emit light, the micro LED display device 1 of this embodiment can utilize both of the PWM technology and the PAM technology to control different subpixel circuits of the pixels. That is, this embodiment provides a novel circuitry configuration with two independent subpixel circuits in one pixel and utilizes both of the PWM technology and the PAM technology for controlling two kinds of subpixel circuits, thereby solving the color shift problem of the PAM technology and being suitable for high-resolution display.

The configurations of driving methods of the first subpixel circuit PC1 and the second subpixel circuit PC2 of each pixel P of the above embodiment will be described in detail with reference to FIGS. 2A, 2B and 3. Herein, the reference numbers S1~Sm, Si, SL1 and SL2 can optionally represent the corresponding scan lines or the scan signals. In addition, i is a number between 1 and m ($1 \leq i \leq m$), and m and n are positive integers (m indicates the number of scan lines, n indicates the number of data lines). In this following, the "control terminal" of a transistor may be the gate of the transistor, the "first terminal" of a transistor may be the first source/drain of the transistor, and the "second terminal" of a transistor may be the second source/drain of the transistor.

In the embodiment of FIG. 2A, the first subpixel circuit PC1 is, for example, a 2T circuit structure, but this disclosure is not limited thereto. In different embodiments, the first subpixel circuit PC1 can be any of other circuit structures, such as 1T circuit structure (including only one switch transistor), or any of other circuit structures. In addition, in the embodiment of FIG. 2B, the second subpixel circuit PC2 is, for example, a 2T1C circuit structure, but this disclosure is not limited thereto. In different embodiments, the second subpixel circuit PC2 can be any of other circuit structures.

As shown in FIG. 2A, the first subpixel circuit PC1 of this embodiment includes a switch transistor T1 and a driving transistor T2. The switch transistor T1 can be controlled to turn on by a scan signal so as to receive a first data signal $D_{P1}$. In this case, the control terminal of the switch transistor T1 connects to a scan line Si for receiving a scan signal, the first terminal of the switch transistor T1 connects to one of the data lines DL1 for receiving the first data signal $D_{P1}$, the second terminal of the switch transistor T1 connects to the control terminal of the driving transistor T2, the first terminal of the driving transistor T2 is coupled to a first voltage $V_{DD}$, the second terminal of the driving transistor T2 connects to one end of the corresponding first light-emitting element L1, and the other end of the first light-emitting element L1 is electrically connected to a second voltage $V_{EE}$. According to this configuration, the driving transistor T2 can drive the first light-emitting element L1 to emit light based on the first data signal $D_{P1}$ transmitted from the switch transistor T1. In particular, since the first data signal $D_{P1}$ is a PWM signal, the first subpixel circuit PC1 is not configured with the capacitor for remaining the voltage level and stabling the voltage. In this embodiment, the switch transistor T1 and the driving transistor T2 are P-type transistors such as, for example but not limited to, P-type MOSFET. It should be understood that each of the transistors can be an N-type transistor.

As shown in FIG. 2B, the second subpixel circuit PC2 also includes a switch transistor T1 and a driving transistor T2. In addition, since the second data signal $D_{P2}$ is a PAM signal, the second subpixel circuit PC2 further includes a capacitor C for remaining the voltage level of the second light-emitting element L2. In this case, one end of the capacitor C connects to the second terminal of the switch transistor T1 and the control terminal of the driving transistor T2, and the other end of the capacitor C connects to the first voltage $V_{DD}$ and the first terminal of the driving transistor T2.

As shown in FIG. 3, in one frame time FT, the scan driving circuit 13 transmits at least two times of scan signals to drive the first subpixel circuits PC1, so that the first data driving circuit 12*a* provides the corresponding first data signals $D_{P1}$ (PWM signal) to the first subpixel circuits PC1 so as to control the first light-emitting elements L1 to emit light. Specifically, since the red-light micro LED (the first light-emitting element L1) has a very low performance under low current density, the scan driving circuit 13 of this embodiment will provide two times of scan signals during one frame time FT to drive and turn on the switch transistor T1 of the first subpixel circuit PC1 twice. Then, the first data driving circuit 12*a* can provide two times of the first data signals $D_{P1}$ to the first subpixel circuit PC1. Accordingly, the first light-emitting element L1 (the red-light micro LED) can be provided with a higher current density so as to achieve a higher performance operation. Moreover, this configuration can achieve the power saving purpose and make the display device provide higher brightness. In some embodiments, the scan driving circuit 13 may output more than two times (e.g. three times, four times or more) of the scan signals to driving the first subpixel circuits PC1, so that the first data driving circuit 12*a* can provide more than two times of the corresponding first data signals $D_{P1}$ (PWM signal) to the first subpixel circuits PC1. To be noted, this disclosure is not limited thereto.

In addition, since the second subpixel circuit PC2 includes the capacitor C for remaining the driving current of the second light-emitting element L2, the second data driving circuit 12*b* only provides one time of the second data signal $D_{P2}$ (PAM signal) during one frame time FT to each second subpixel circuit PC2 to turn on the corresponding second light-emitting element L2 (the green-light or blue-light micro LED). In this embodiment, before the scan driving circuit 13 transmits the second time of the scan signal to drive the first subpixel circuits PC1 (i.e., the first data driving circuit 12*a* transmits the second time of the first data signal $D_{P1}$ to each first subpixel circuit PC1), the second data driving circuit 12*b* has transmitted the second data signal $D_{P2}$ to each of the second subpixel circuits PC2. Therefore, after the scan driving circuit 13 transmits the first time of the scan signal to drive the first subpixel circuits PC1, the second data lines DL2 connected to the second subpixel circuits PC2 are in idle contact. This configuration can achieve the power saving purpose.

In addition, as shown in FIG. 3, the frequency of the first data signal $D_{P1}$ is twice or more of that of the second data signal $D_{P2}$. For example, if the frequency of the second data signal $D_{P2}$ is 60 Hz, the frequency of the first data signal $D_{P1}$ for the first subpixel circuits PC1 is equal to or greater than 120 Hz. Accordingly, the viewer will not perceive the image flickering.

In different embodiments, each pixel P may include two first subpixel circuits PC1 and one second subpixel circuit PC2. One of the first subpixel circuits PC1 can drive the corresponding first light-emitting element L1 to emit red light (i.e., one of the first light-emitting elements L1 is a red-light micro LED), the other one of the first subpixel circuits PC1 can drive the corresponding first light-emitting element L1 to emit green light (i.e., the other one of the first light-emitting elements L1 is a green-light micro LED), and the second subpixel circuit PC2 can drive the corresponding second light-emitting element L2 to emit blue light (i.e., the second light-emitting elements L2 is a blue-light micro LED). In this case, the first data driving circuit 12*a* provides two times of the first data signals $D_{P1}$ to two first subpixel circuits PC1, respectively, so that the red-light micro LED (one of the first light-emitting elements L1) can have a higher current density, thereby achieving the power saving purpose and simultaneously improving the color shift issue of the green-light micro LED (the other one of the first light-emitting elements L1).

Figure 4A:
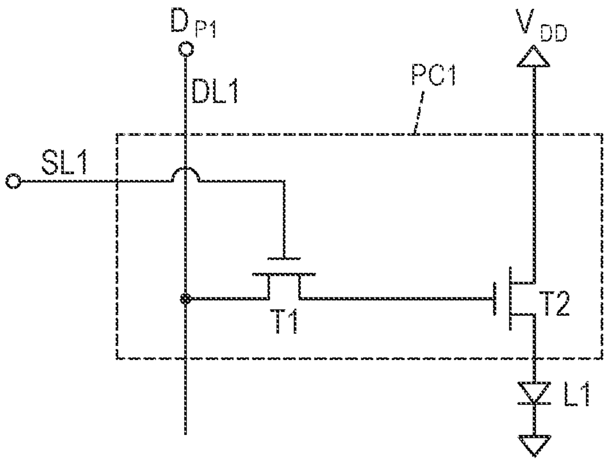
FIG. 4A is a schematic diagram showing the first subpixel circuit according to another embodiment of this disclosure.
Figure 4B:
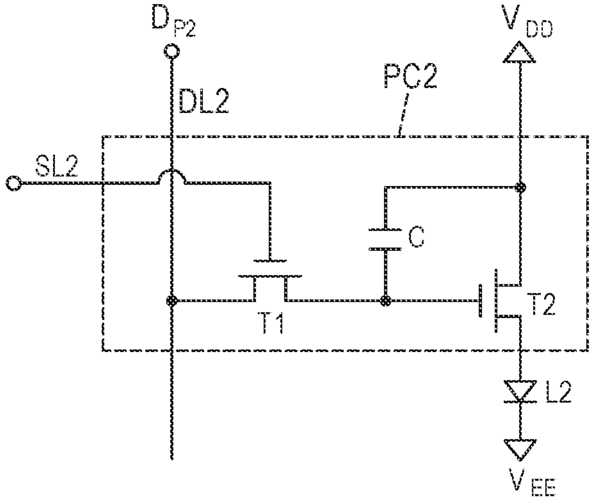
FIG. 4B is a schematic diagram showing the second subpixel circuit according to another embodiment of this disclosure.
Figure 4C:
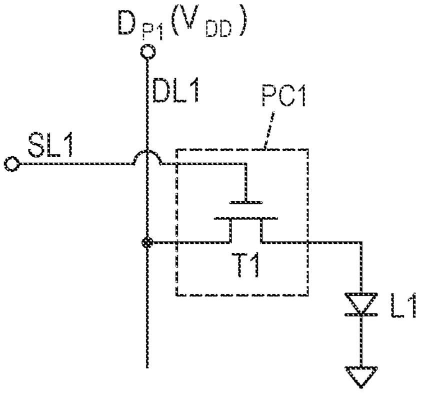
FIG. 4C is a schematic diagram showing the first subpixel circuit according to another embodiment of this disclosure.
Figure 4D:
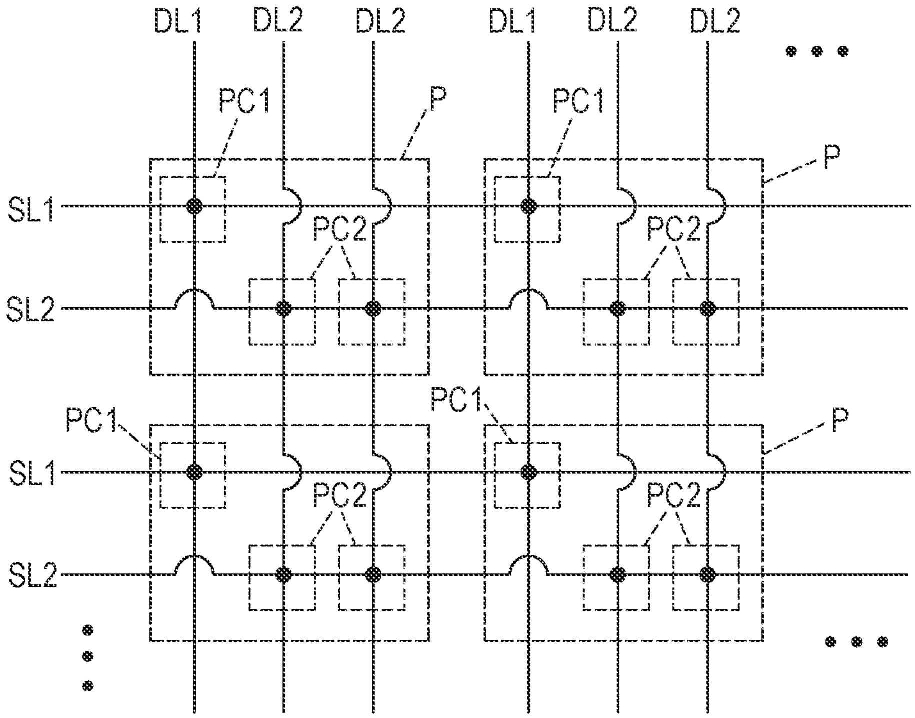
FIG. 4D is a schematic diagram showing the connection of the pixels, scan lines and data lines according to an embodiment of this disclosure.
Figure 4E:
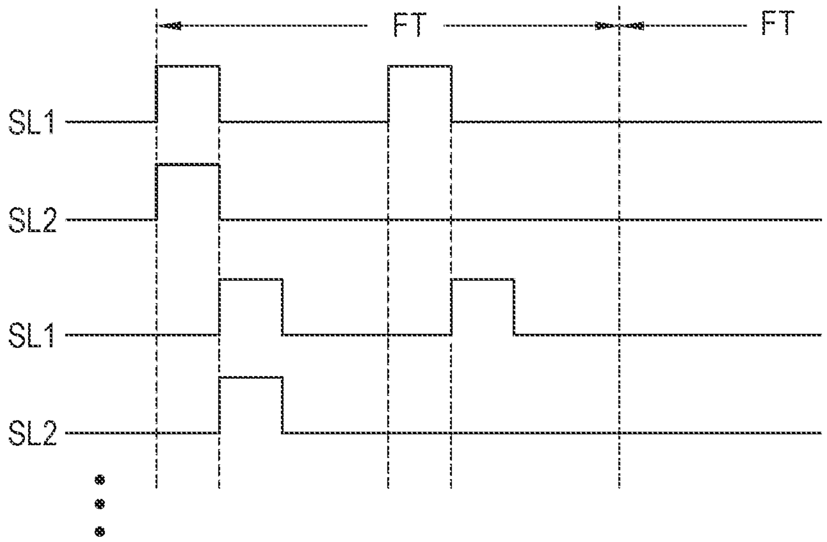
FIG. 4E is a waveform diagram showing the waveforms of signals for FIG. 4D.

Please refer to FIGS. 4A to 4E. FIG. 4A is a schematic diagram showing the first subpixel circuit according to another embodiment of this disclosure, FIG. 4B is a schematic diagram showing the second subpixel circuit according to another embodiment of this disclosure, FIG. 4C is a schematic diagram showing the first subpixel circuit according to another embodiment of this disclosure, FIG. 4D is a schematic diagram showing the connection of the pixels, scan lines and data lines according to an embodiment of this disclosure, and FIG. 4E is a waveform diagram showing the waveforms of signals for FIG. 4D.

Referring to FIGS. 4A and 4B, the component arrangements and connections of the first subpixel circuits and the second subpixel circuits of this embodiment are mostly the same as those of the previous embodiment of FIGS. 2A and 2B. Unlike the previous embodiment, the scan lines of this embodiment include a plurality of first scan lines SL1 and a plurality of second scan lines SL2, and the first scan lines SL1 and the second scan lines SL2 are alternately arranged. In this embodiment, the first scan lines SL1 respectively connect to the first subpixel circuits PC1 of the same row, and the second scan lines SL2 respectively connect to the second subpixel circuits PC2 of the same row.

In another embodiment, as shown in FIG. 4C, the first subpixel circuit PC1 does not include the driving transistor T2, and the switch transistor T1 of the first subpixel circuit PC1 directly controls the first light-emitting element L1 to emit light. In this case, when the signal of the first scan line SL1 controls to turn on the switch transistor T1, the first voltage $V_{DD}$ and the first data signal $D_{P1}$ (PWM signal) are provided to the first light-emitting element L1 via the switch transistor T1 to control the first light-emitting element L1 to emit light. This configuration can decrease the voltage drop of the first voltage $V_{DD}$ or the first data signal $D_{P1}$.

In addition, FIG. 4D does not show the light-emitting elements L1 and L2. As shown in FIG. 4D, the first subpixel circuits PC1 of the pixels P of the same row are connected to the same one of the first scan lines SL1, and the second subpixel circuits PC2 of the pixels P of the same row are connected to the same one of the second scan lines SL2. One first scan line SL1 connects to the first subpixel circuits PC1 of the pixels P of one row, and the second scan line SL2 located adjacent to the first scan line SL1 connects to the second subpixel circuits PC2 of the pixels P of the same row.

As shown in FIG. 4E, the scan driving circuit 13 can simultaneously drive the first subpixel circuits PC1 and the second subpixel circuits PC2 of the pixels P of the same row via the first scan line SL1 and the second scan line SL2. Since the scan line connecting to the first subpixel circuits PC1 is independent to the scan line connecting to the second subpixel circuits PC2, it is not needed to set the second data lines DL2 connecting to the second subpixel circuits PC2 as idle contact when the first scan line SL1 outputs the second time of the scan signal to the first subpixel circuits PC1. Therefore, the control of the second data driving circuit 12*b* can be simpler.

Figure 5:
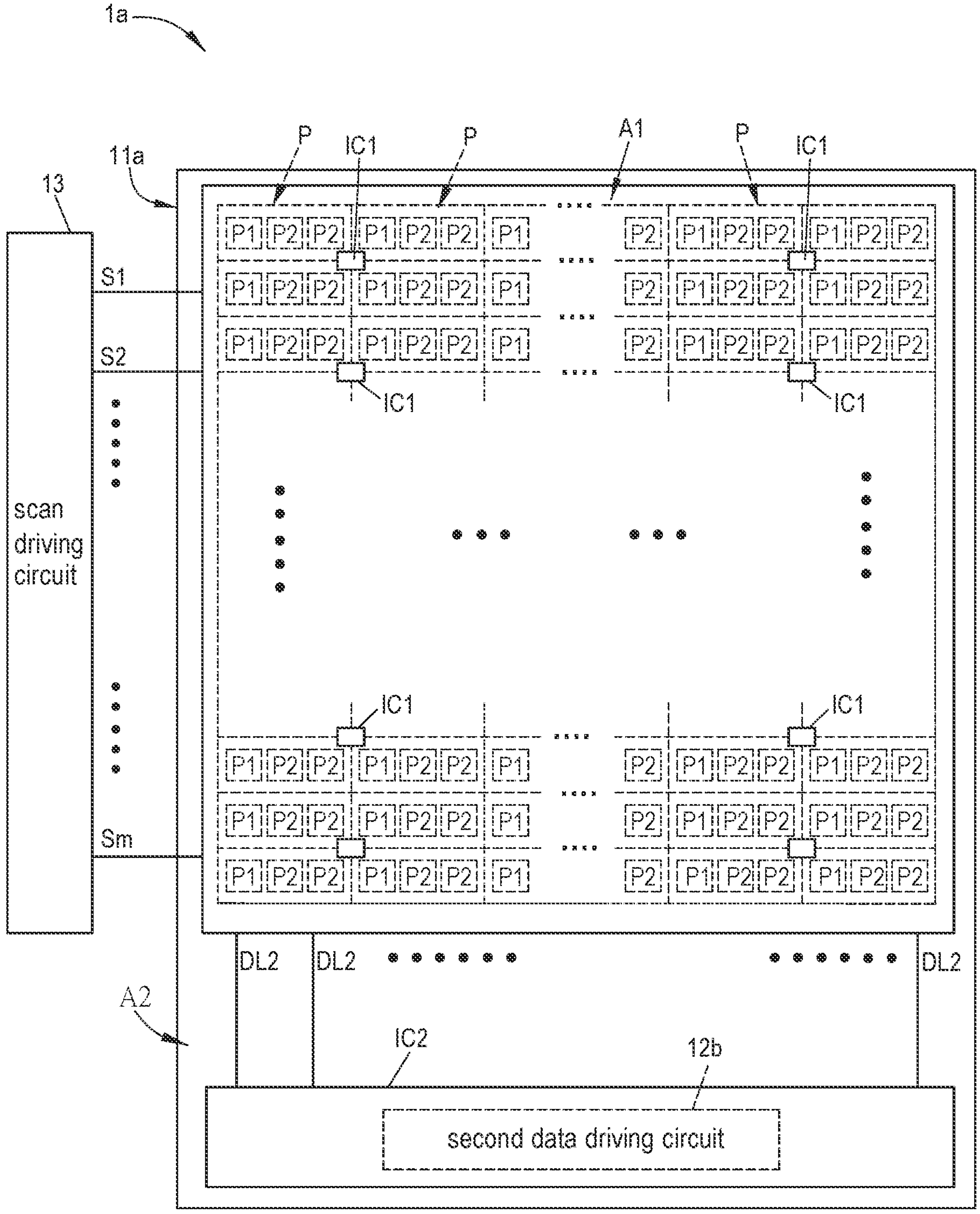
FIG. 5 is a schematic diagram showing a micro LED display device according to another embodiment of this disclosure.

FIG. 5 is a schematic diagram showing a micro LED display device according to another embodiment of this disclosure. As shown in FIG. 5, the component configurations and connections of the micro LED display device 1*a* of this embodiment are mostly the same as those of the micro LED display device 1 of the previous embodiment. Unlike the previous embodiment, the micro LED display device 1*a* of this embodiment further includes a plurality of first integrated circuits IC1 and a second integrated circuit IC2. The first integrated circuits IC1 are arranged on a display area A1 of the display substrate 11*a*, and the first integrated circuits IC1 include the first data driving circuit. The second integrated circuit IC2 is arranged on a non-display area A2 of the display substrate 11*a*, and the second integrated circuit IC2 includes the second data driving circuit 12*b*. In this case, each of the first integrated circuits IC1 is electrically connected to at least one of the first subpixel circuits PC1 of the pixels P, and the second integrated circuit IC2 is electrically connected to the second subpixel circuits PC2 of the pixels P.

Specifically, the first data driving circuit can be divided, based on the positions of the first subpixel circuits PC1 on the display area A1, and fabricated into a plurality of corresponding first integrated circuits IC1 (e.g., micro integrated circuits), and the first integrated circuits IC1 are respectively disposed at the corresponding positions on the display area A1 by, for example, COB (Chip On Board) technology, so as to respectively provide the first data signals $D_{P1}$ to the corresponding first subpixel circuits PC1. In addition, the second data driving circuit can be fabricated into a second integrated circuit IC2 and disposed on the non-display area A2 so as to respectively provide the second data signals $D_{P2}$ to the second subpixel circuits PC2.

In this embodiment, each of the first integrated circuits IC1 is electrically connected to the four first subpixel circuits PC1 of adjacent four pixels P, so as to respectively provide the first data signals $D_{P1}$ to the four corresponding first subpixel circuits PC1, and the second integrated circuit IC2 is electrically connected to the second subpixel circuits PC2 of the pixels P via the second data lines DL2, respectively, so as to respectively provide the second data signals $D_{P2}$ to the corresponding second subpixel circuits PC2.

This disclosure also provides a driving method of the micro LED display device, which includes the following steps of: the data driving circuit transmitting a first data signal to each of the first subpixel circuits to drive each of the first light-emitting elements; and the data driving circuit transmitting a second data signal to each of the second subpixel circuits to drive each of the second light-emitting elements; wherein the first data signal is a pulse-width modulation (PWM) signal, and the second data signal is a pulse-amplitude modulation (PAM) signal. In some embodiments, the frequency of the first data signal is twice or more of the frequency of the second data signal. In some embodiments, the data driving circuit includes a first data driving circuit and a second data driving circuit, wherein the first data driving circuit transmits the first data signal to each of the first subpixel circuits to drive each of the first light-emitting elements, and the second data driving circuit transmits the second data signal to each of the second subpixel circuits to drive each of the second light-emitting elements.

In some embodiments, the driving method further includes a step of: in one frame time, the scan driving circuit transmitting at least two times of scan signals to drive the first subpixel circuits, so that the data driving circuit provides the corresponding first data signals to the first subpixel circuits so as to control the first light-emitting elements to emit light. In some embodiments, in the frame time, the data driving circuit provides one time of the second data signal to each of the second subpixel circuits. In some embodiments, before the scan driving circuit transmits the second time of the scan signal to drive the first subpixel circuits, the data driving circuit has transmitted the second data signal to each of the second subpixel circuits. In some embodiments, after the scan driving circuit transmits the first time of the scan signal to drive the first subpixel circuits, the data lines connected to the second subpixel circuits are in idle contact. In some embodiments, the driving method further includes a step of: the scan driving circuit simultaneously driving the first subpixel circuits of the same row and the second subpixel circuits of the same row via the first scan line and the second scan line that connect to the pixels of the same row.

To be noted, the other technical features of the driving method of the micro LED display device of this embodiment can refer to the description of the previous embodiments, so the detailed descriptions thereof will be omitted.

In summary, in the micro LED display device and driving method thereof, each pixel includes a first subpixel circuit and a second subpixel circuit, which are independently configured, and the data driving circuit transmits the first data signal (PWM signal) to each first subpixel circuit to drive each first light-emitting element to emit light and transmits the second data signal (PAM signal) to each second subpixel circuit to drive each second light-emitting element to emit light. Compared with the conventional micro LED display device, which has the pixels (subpixels) all configured with the same circuits and utilizes either the PWM technology or the PAM technology to control the light-emitting elements of all pixels to emit light, the micro LED display device of this disclosure has a novel circuitry configuration with two independent subpixel circuits in one pixel and utilizes a novel driving method for controlling the two kinds of subpixel circuits, thereby solving the color shift problem of the PAM technology and being suitable for high-resolution display. Moreover, in some embodiments, the disclosure can further achieve the high performance operation so as to achieve the power saving purpose.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A micro light-emitting diode display device, comprising:

a display substrate comprising a plurality of pixels, each of the pixels comprising:

a first subpixel having a first subpixel circuit and a first light-emitting element electrically connected to the first subpixel circuit, and a second subpixel having a second subpixel circuit and a second light-emitting element electrically connected to the second subpixel circuit, wherein the first subpixel circuit and the second subpixel circuit are configured independently with each other; and a data driving circuit electrically connected to the first subpixel circuits and the second subpixel circuits via a plurality of data lines;

wherein, the data driving circuit transmits a first data signal to each of the first subpixel circuits to drive each of the first light-emitting elements, the data driving circuit transmits a second data signal to each of the second subpixel circuits to drive each of the second light-emitting elements, the first data signal is a pulse-width modulation (PWM) signal, and the second data signal is a pulse-amplitude modulation (PAM) signal;

wherein, the display device further comprises a scan driving circuit electrically connected to the first subpixel circuits and the second subpixel circuits via a plurality of scan lines; and wherein, in one frame time, the scan driving circuit transmits at least two times of scan signals to drive the first subpixel circuits, so that the data driving circuit provides the corresponding first data signals to the first subpixel circuits so as to control the first light-emitting elements to emit light.

2. The display device of claim 1, wherein the first light-emitting element is red-light micro LED, and the second light-emitting element is a blue-light micro LED.

3. The display device of claim 1, wherein each of the first subpixel circuits comprises a switch transistor, each of the second subpixel circuits comprises a switch transistor and a capacitor for keeping a voltage level of the corresponding second light-emitting element.

4. The display device of claim 1, wherein each of the first subpixel circuits comprises a switch transistor and a driving transistor, a control terminal of the switch transistor connects to a scan line for receiving a scan signal, a first terminal of the switch transistor connects to one of the data lines for receiving the first data signal, a second terminal of the switch transistor connects to a control terminal of the driving transistor, a first terminal of the driving transistor is coupled to a first voltage, a second terminal of the driving transistor connects to one end of the corresponding first light-emitting element, and the other end of the corresponding first light-emitting element is electrically connected to a second voltage.

5. The display device of claim 1, wherein each of the second subpixel circuits comprises a switch transistor, a driving transistor and a capacitor, a control terminal of the switch transistor connects to a scan line for receiving a scan signal, a first terminal of the switch transistor connects to one of the data lines for receiving the second data signal, a second terminal of the switch transistor connects to a control terminal of the driving transistor, a first terminal of the driving transistor is coupled to a first voltage, a second terminal of the driving transistor connects to one end of the corresponding second light-emitting element, the other end of the corresponding second light-emitting element is electrically connected to a second voltage, one end of the capacitor connects to the second terminal of the switch transistor and the control terminal of the driving transistor, and the other end of the capacitor connects to the first voltage and the first terminal of the driving transistor.

6. The display device of claim 1, wherein in the frame time, the data driving circuit provides one time of the second data signal to each of the second subpixel circuits.

7. The display device of claim 1, wherein before the scan driving circuit transmits the second time of the scan signal to drive the first subpixel circuits, the data driving circuit has transmitted the second data signal to each of the second subpixel circuits.

8. The display device of claim 7, wherein after the scan driving circuit transmits the first time of the scan signal to drive the first subpixel circuits, the data lines connected to the second subpixel circuits are in idle contact.

9. The display device of claim 1, wherein the scan lines comprises a plurality of first scan lines and a plurality of second scan lines, the first scan lines and the second scan lines are alternately arranged, the first scan lines respectively connect to the first subpixel circuits of the same row, and the second scan lines respectively connect to the second subpixel circuits of the same row.

10. The display device of claim 9, wherein the scan driving circuit simultaneously drives the first subpixel circuits of the same row and the second subpixel circuits of the same row via the first scan line and the second scan line that connect to the pixels of the same row.

11. The display device of claim 1, wherein a frequency of the first data signal is twice or more of a frequency of the second data signal.

12. The display device of claim 1, wherein the data lines comprises a plurality of first data lines and a plurality of second data lines, and the data driving circuit comprises:

a first data driving circuit electrically connected to the first subpixel circuits via the first data lines; and a second data driving circuit electrically connected to the second subpixel circuits via the second data lines;

wherein, the first data driving circuit transmits the first data signal to each of the first subpixel circuits to drive each of the first light-emitting elements, and the second data driving circuit transmits the second data signal to each of the second subpixel circuits to drive each of the second light-emitting elements.

13. The display device of claim 12, further comprising:

a plurality of first integrated circuits arranged on a display area of the display substrate, wherein the first integrated circuits comprise the first data driving circuit; and a second integrated circuit arranged on a non-display area of the display substrate, wherein the second integrated circuit comprises the second data driving circuit;

wherein, each of the first integrated circuits connects to at least one of the first subpixel circuits of the pixels, and the second integrated circuit is electrically connected to the second subpixel circuits of the pixels.

14. A driving method of a micro light-emitting diode display device, wherein the display device comprises a display substrate and a data driving circuit, the display substrate comprises a plurality of pixels, each of the pixels comprises a first subpixel and a second subpixel, the first subpixel has a first subpixel circuit and a first light-emitting element electrically connected to the first subpixel circuit, the second subpixel has a second subpixel circuit and a second light-emitting element electrically connected to the second subpixel circuit, the first subpixel circuit and the second subpixel circuit are configured independently with each other, and the data driving circuit is electrically connected to the first subpixel circuits and the second subpixel circuits via a plurality of data lines, the driving method comprising steps of:

the data driving circuit transmitting a first data signal to each of the first subpixel circuits to drive each of the first light-emitting elements; and the data driving circuit transmitting a second data signal to each of the second subpixel circuits to drive each of the second light-emitting elements;

wherein, the first data signal is a pulse-width modulation (PWM) signal, and the second data signal is a pulse-amplitude modulation (PAM) signal; and wherein, the display device further comprises a scan driving circuit electrically connected to the first subpixel circuits and the second subpixel circuits via a plurality of scan lines, and the driving method further comprises a step of:

in one frame time, the scan driving circuit transmitting at least two times of scan signals to drive the first subpixel circuits, so that the data driving circuit provides the corresponding first data signals to the first subpixel circuits so as to control the first light-emitting elements to emit light.

15. The driving method of claim 14, wherein the first light-emitting element is red-light micro LED, and the second light-emitting element is a blue-light micro LED.

16. The driving method of claim 14, wherein in the frame time, the data driving circuit provides one time of the second data signal to each of the second subpixel circuits.

17. The driving method of claim 14, wherein before the scan driving circuit transmits the second time of the scan signal to drive the first subpixel circuits, the data driving circuit has transmitted the second data signal to each of the second subpixel circuits.

18. The driving method of claim 17, wherein after the scan driving circuit transmits the first time of the scan signal to drive the first subpixel circuits, the data lines connected to the second subpixel circuits are in idle contact.

19. The driving method of claim 14, wherein the scan lines comprises a plurality of first scan lines and a plurality of second scan lines, the first scan lines and the second scan lines are alternately arranged, the first scan lines respectively connect to the first subpixel circuits of the same row, the second scan lines respectively connect to the second subpixel circuits of the same row, and the driving method further comprises a step of:

the scan driving circuit simultaneously driving the first subpixel circuits of the same row and the second subpixel circuits of the same row via the first scan line and the second scan line that connect to the pixels of the same row.

20. The driving method of claim 14, wherein a frequency of the first data signal is twice or more of a frequency of the second data signal.

* * * * *